(12) United States Patent
Lin

(10) Patent No.: US 9,797,543 B2
(45) Date of Patent: Oct. 24, 2017

(54) ADJUSTABLE TABLET DEVICE HOLDER

(71) Applicant: CHEN-SOURCE INC., Taoyuan (TW)

(72) Inventor: Po-Hsuan Lin, Taoyuan (TW)

(73) Assignee: Chen-Source Inc., Taoyuan (TW)

(*) Notice: Subject to any disclaimer, the term of this patent is extended or adjusted under 35 U.S.C. 154(b) by 0 days.

(21) Appl. No.: 15/072,947

(22) Filed: Mar. 17, 2016

(65) Prior Publication Data

US 2017/0188724 A1    Jul. 6, 2017

(30) Foreign Application Priority Data

Jan. 4, 2016 (TW) .............................. 105200029 U

(51) Int. Cl.
*F16M 11/04* (2006.01)
*F16M 13/00* (2006.01)
*E05B 73/00* (2006.01)

(52) U.S. Cl.
CPC ....... *F16M 11/041* (2013.01); *E05B 73/0082* (2013.01); *F16M 13/00* (2013.01)

(58) Field of Classification Search
CPC .... A47F 7/024; A47F 7/0246; E05B 73/0082; H05K 5/0204; H05K 5/0208; F16M 11/041; F16M 13/00; F16M 2200/02
USPC .............. 248/551, 552, 553, 346.03, 346.06, 248/346.07, 122.1, 292.12, 309.1, 316.1, 248/316.4, 924, 670, 231.41, 451, 452, 248/453; 379/446, 454, 455; 361/679.56, 679.57, 679.58
See application file for complete search history.

(56) References Cited

U.S. PATENT DOCUMENTS

| | | | | |
|---|---|---|---|---|
| 5,457,745 A * | 10/1995 | Wang | ............... | B60R 11/0241 379/426 |
| 7,272,984 B2 * | 9/2007 | Fan | ............... | B60R 11/02 248/231.61 |
| 7,407,143 B1 * | 8/2008 | Chen | ............... | B60R 11/0241 248/309.1 |
| 7,537,190 B2 * | 5/2009 | Fan | ............... | B60R 11/02 248/309.1 |
| 7,607,629 B1 * | 10/2009 | Carrasco | ............... | A61J 9/06 248/102 |
| 7,967,269 B2 * | 6/2011 | Liu | ............... | F16M 13/02 248/176.3 |
| 8,567,737 B2 * | 10/2013 | Chen | ............... | F16M 11/041 248/313 |

(Continued)

*Primary Examiner* — Stanton L Krycinski
*Assistant Examiner* — Guang H Guan
(74) *Attorney, Agent, or Firm* — Muncy, Geissler, Olds & Lowe, P.C.

(57) ABSTRACT

An adjustable tablet device holder includes a holder body including an arched sliding slot located in the back side and a locating plate extended from the back side adjacent to the arched sliding slot, and an adjustment mechanism including a turnable mounted in the holder body and having a position-limit rod extended out of the arched sliding slot and movable between the two ends of the arched sliding slot to rotate the turnable and lockable to the locating plate by a lock to stop the turntable from rotation and four clamping plates vertically and horizontally mounted in four sides and defining a clamping space for holding a mobile tablet device and movable inwardly and outwardly to adjust the horizontal width and vertical height of the clamping space upon rotation of the turnable.

5 Claims, 8 Drawing Sheets

(56) References Cited

U.S. PATENT DOCUMENTS

| | | | | |
|---|---|---|---|---|
| 8,638,557 B2* | 1/2014 | Tsai | .................... | F16M 11/041 |
| | | | | 248/919 |
| 8,711,553 B2* | 4/2014 | Trinh | .................... | A47F 7/0246 |
| | | | | 248/206.5 |
| 8,833,716 B2* | 9/2014 | Funk | .................... | F16M 13/02 |
| | | | | 248/309.1 |
| 9,004,434 B2* | 4/2015 | Kang | .................... | H04M 1/04 |
| | | | | 248/229.12 |
| 9,115,843 B2* | 8/2015 | Huang | .................. | F16M 11/08 |
| 9,161,466 B2* | 10/2015 | Huang | ................ | H05K 5/0204 |
| 9,334,679 B2* | 5/2016 | Lin | ....................... | F16M 13/02 |
| 2012/0312936 A1* | 12/2012 | Huang | ................ | F16M 11/041 |
| | | | | 248/122.1 |
| 2014/0263931 A1* | 9/2014 | Chen | .................. | F16M 11/041 |
| | | | | 248/576 |

* cited by examiner

ADJUSTABLE TABLET DEVICE HOLDER

BACKGROUND OF THE INVENTION

This application claims the priority benefit of Taiwan patent application number 105200029, filed on Jan. 4, 2016.

1. Field of the Invention

The present invention relates to a device holder mountable in an exhibition rack or any other support means for holding a mobile electronic tablet device, and more particularly to an adjustable tablet device holder, which is conveniently adjustable subject to the size of the mobile tablet device to be held and lockable by a lock to protect the loaded mobile tablet device against theft.

2. Description of the Related Art

With fast development of electronic and multimedia technologies, advanced and sophisticated mobile tablet devices such as tablet computer, smart phone, GPS, LCD screen, etc. have been continuously created. For the advantages of convenient application and ease of carrying, the penetration rate of mobile tablet devices is very high, almost everybody has one of them. In order to reduce space occupation and to facilitate application and carrying, modern electronic devices are designed to provide the characteristics of small size, light weight and high mobility with high operating speed and application flexibility. Thus, these advanced mobile tablet devices have been widely used in offices, homes, and other recreational and entertainment places for different applications.

Further, different exhibition racks with adjustable and retractable multi-segment support arms and joints are widely used in stores or exhibition centers for holding mobile tablet devices for field trials, selection and/or exhibition. These exhibition racks allow adjustment of the clamping space for holding different sizes of mobile tablet devices for exhibition. Mobile tablet devices are commonly expensive and have a small size. However, conventional exhibition racks are simply designed for holding mobile tablet devices for exhibition without providing any security measures. Mobile tablet devices exhibited in exhibition racks can easily be stolen by an evil person. In order to protect the displayed mobile tablet devices against theft, people usually will install locks in the exhibition racks to lock the displayed mobile tablet devices to the device holders of the exhibition racks. Further, because there are gaps in the gears of the transmission gear set of the adjustment mechanism in a conventional exhibition rack, an evil person can bias the adjustable and retractable multi-segment support arms by violence to create a gap around the displayed mobile tablet device and then to take the displayed mobile tablet device from the device holder. Stolen mobile tablet device cases occur in stores and exhibition centers quite often. Although conventional exhibition racks facilitate the display of mobile tablet devices, but they are vulnerable to damage, and therefore, there are still room for improvement.

Therefore, it is desirable to provide a tablet device holder, which allows adjustment of the clamping space to fit different sizes of mobile tablet devices and can lock the loaded mobile tablet device in place, effectively protecting it against theft.

SUMMARY OF THE INVENTION

The present invention has been accomplished under the circumstances in view. It is the main object of the present invention to provide an adjustable tablet device holder, which is highly adjustable for holding any of different sizes of mobile tablet devices and lockable by a lock to protect the loaded mobile tablet device against theft.

To achieve this and other objects of the present invention, an adjustable tablet device holder comprises a holder body and an adjustment mechanism. The holder body comprises an accommodation chamber, a sliding slot located in a back side thereof, and a locating plate perpendicularly extended from the back side adjacent to a bottom side of the sliding slot. The adjustment mechanism is mounted in the accommodation chamber of the holder body, comprising a plurality of clamping plates arranged in two pairs and respectively mounted in opposing top and bottom sides and opposing left and right sides of the holder body and respectively movable in and out of the accommodation chamber of the holder body and adapted for holding a mobile tablet device. Each clamping plate comprises an elongated extension wing plate portion slidably inserted into the accommodation chamber of the holder body, a turntable mounted in the accommodation chamber and rotatable clockwise and counter-clockwise to move the elongated extension wing plate portions of each pair of clamping plates inwardly or outwardly relative to each other. The turnable comprises an arm extended from the periphery thereof and a position-limit rod perpendicularly extended from the distal end of the arm and inserted through the sliding slot of the holder body and movable along the sliding slot to rotate the turnable and lockable to the locating plate of the holder body by a lock to prohibit the clamping plates from displacement.

Preferably, the holder body comprises a front base panel and a back base panel fastened together, defining therein an accommodation chamber and horizontal and vertical channels located in the accommodation chamber in a crossed manner. Further, a stub axle is backwardly extended from the front base panel and suspended in the accommodation chamber at the crossed point between the horizontal channel and the vertical channel. Further, a through hole is located on the back base panel for receiving the stub axle. The turnable of the adjustment mechanism is mounted on the stub axle. Further, the clamping plates define with the front base panel a clamping space for securing a mobile tablet device. The adjustment mechanism further comprises a transmission gear set consisting of two gears and mounted on the stub axle for synchronous rotation with the turnable. Each clamping plate further comprises a tooth rack longitudinally extended along one lateral side of the respective elongated extension wing plate portion and meshed with the transmission gear set. Thus, when the transmission gear set is rotated with the turnable, the clamping plates are moved inwardly or outwardly in the respective horizontal or vertical channels to adjust the horizontal width and/or vertical height of the clamping space according to the side of the mobile tablet device to be held.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
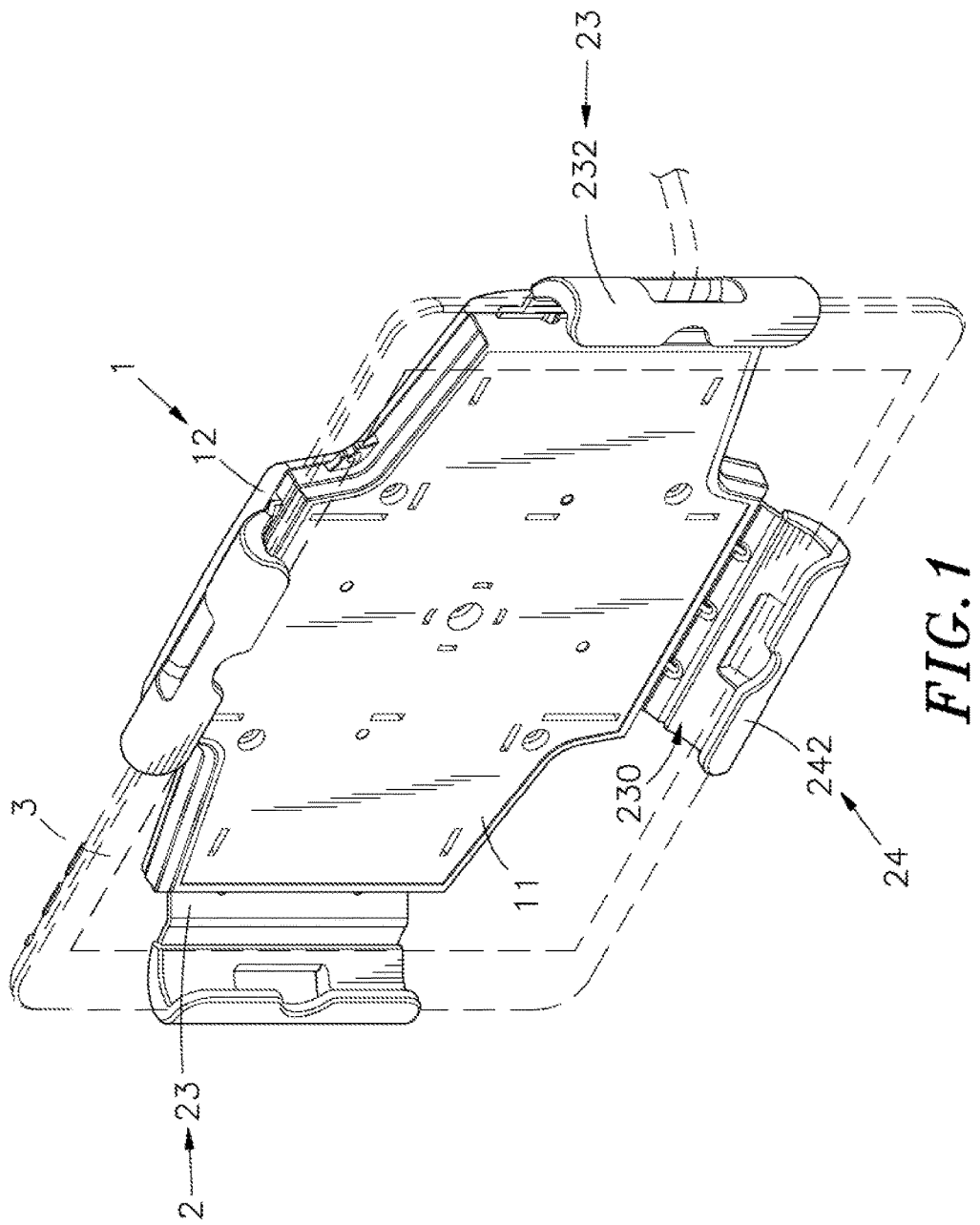
FIG. 1 is a schematic oblique front elevational view of an adjustable tablet device holder in accordance with the present invention.
Figure 2:
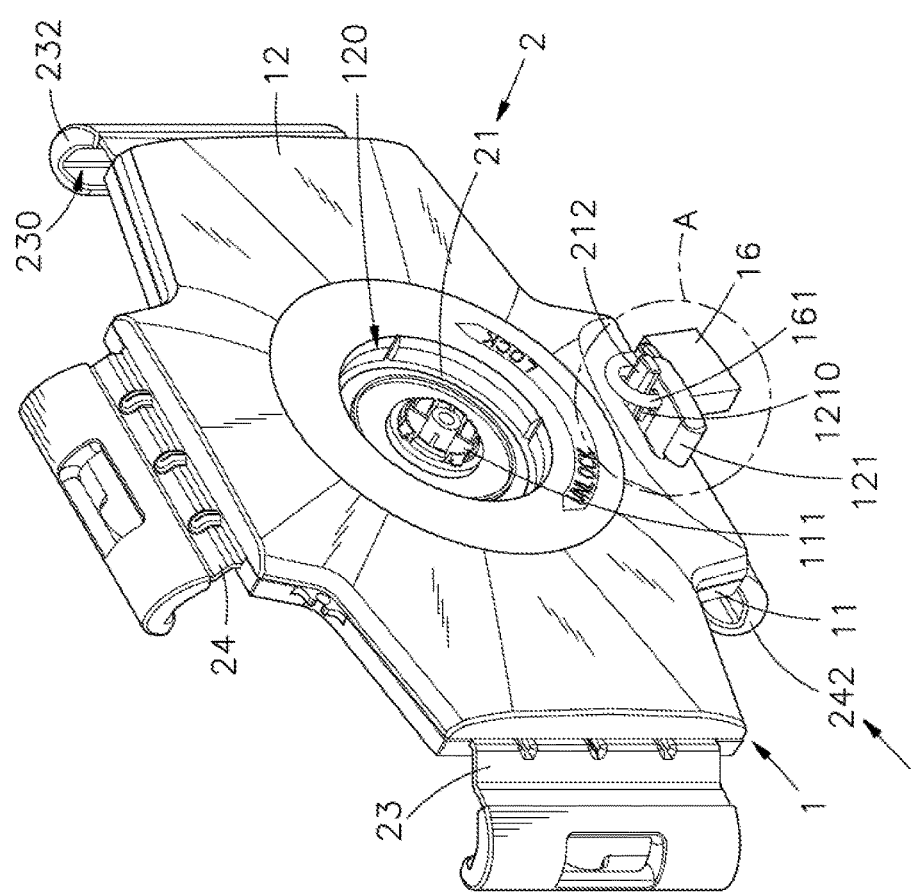
FIG. 2 is a schematic oblique rear elevational view of the adjustable tablet device holder in accordance with the present invention.
Figure 3:
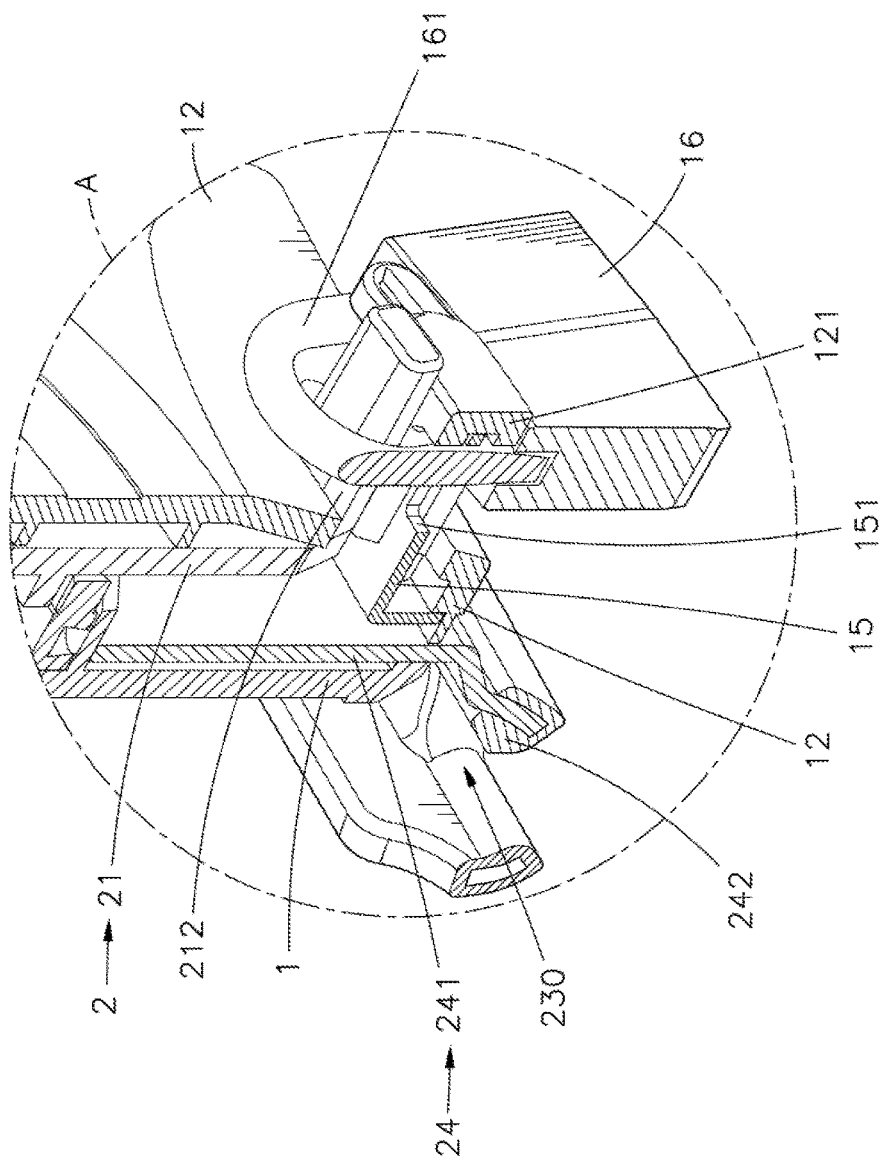
FIG. 3 is an enlarged view of Part A of FIG. 2.
Figure 4:
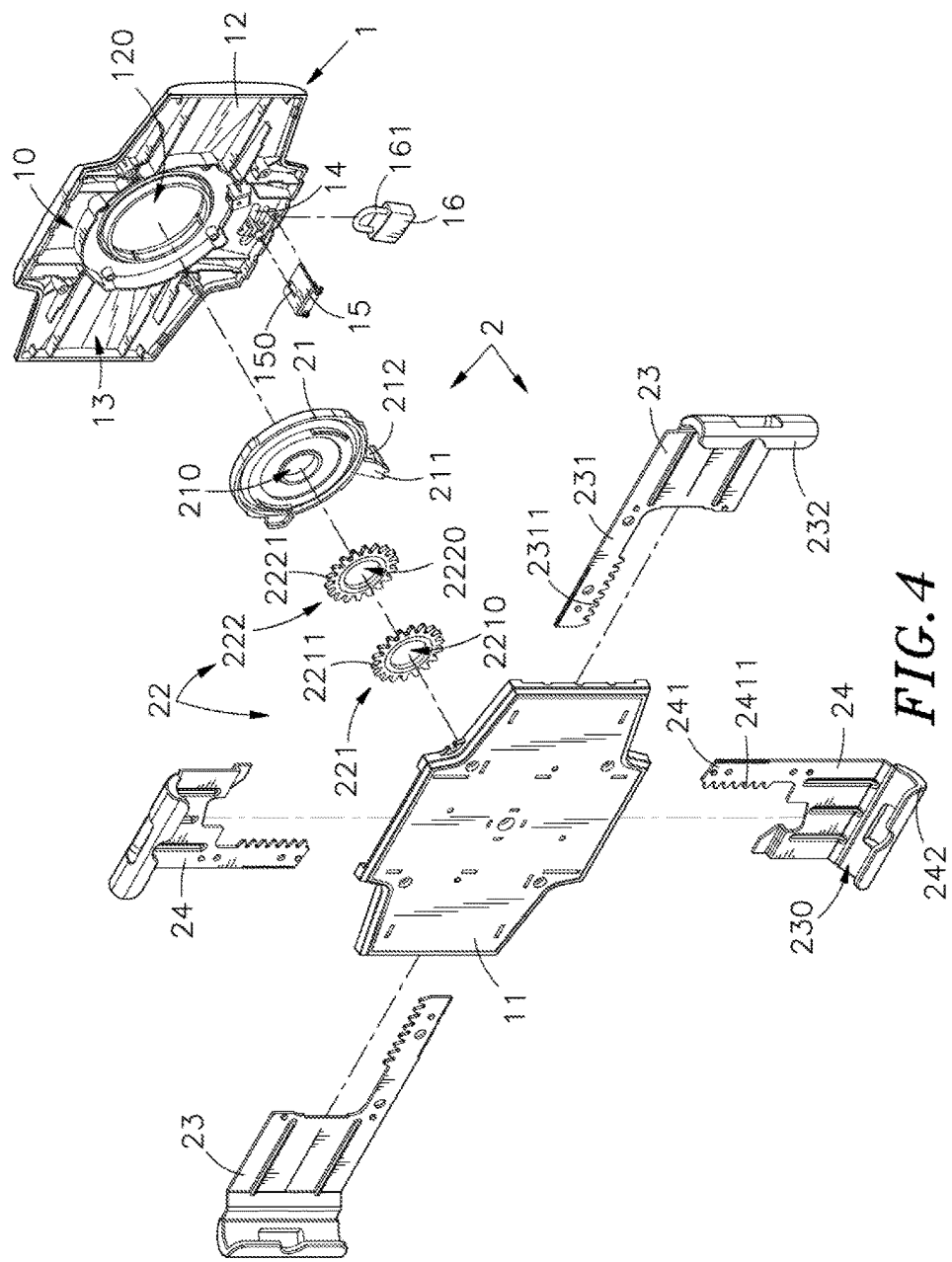
FIG. 4 is an exploded view of the adjustable tablet device holder in accordance with the present invention.
Figure 5:
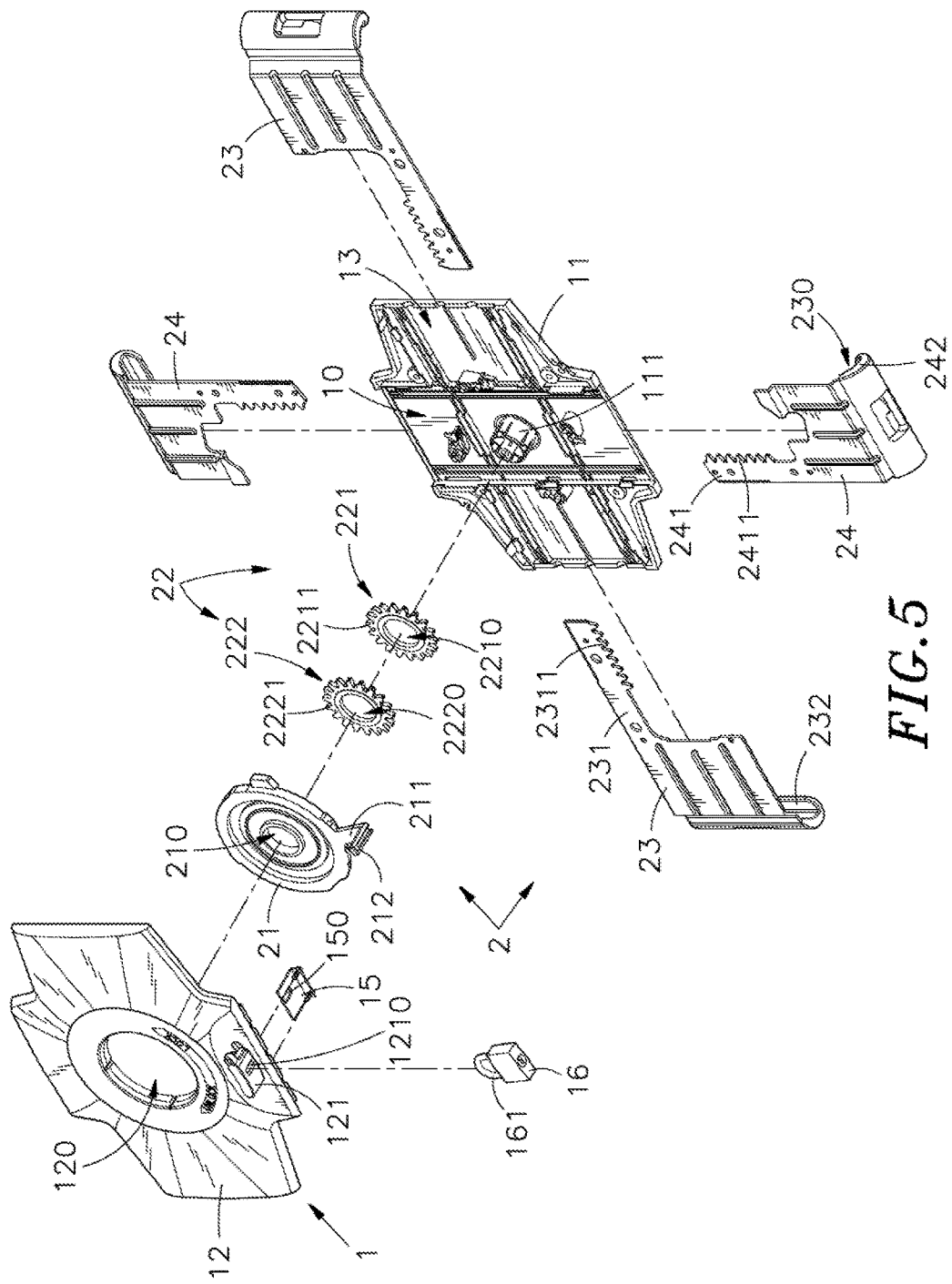
FIG. 5 corresponds to FIG. 4 when viewed from another angle.

Referring to FIGS. 1-5, an adjustable tablet device holder in accordance with the present invention is shown. The adjustable tablet device holder comprises a holder body 1 and an adjustment mechanism 2.

The holder body 1 comprises opposing front and back base panels 11,12, an accommodation chamber 10 defined between the front and back base panels 11,12, horizontal and vertical channels 13 defined in the accommodation chamber 10 in a crossed manner with the ends thereof disposed in communication with the space outside the holder body 1, an stub axle 111 perpendicularly extended from a back wall of the front base panel 11 and suspending in the crossed point between the horizontal and vertical channels 13 inside the accommodation chamber 10, a through hole 120 cut through opposing front and back walls of the back base panel 12 for receiving the stub axle 111, an arched sliding slot 14 cut through the opposing front and back walls of the back base panel 12 below the through hole 120, an arched locating plate 121 perpendicularly extended from the back wall of the back base panel 12 adjacent to the bottom side of the arched sliding slot 14, a lock hole 1210 located in the locating plate 121, a reinforcing plate 15 mounted in the locating plate 121 to reinforce the structural strength of the locating plate 121, a locating hole 150 located in the reinforcing plate 15 corresponding to the lock hole 1210 at the locating plate 121. A shackle 161 of a lock 16 can be inserted through the lock hole 1210 at the locating plate 121 and the locating hole 150 at the reinforcing plate 15 and locked to the locating plate 121.

The adjustment mechanism 2 comprises a turntable 21, a transmission gear set 22 and a plurality of, for example, four clamping plates 23,24. The turntable 21 comprises an axle hole 210 located at the center thereof, an arm 211 radially extended from the periphery thereof, and a position-limit rod 212 perpendicularly extended from the distal end of the arm 211 in direction toward the back base panel 12. The transmission gear set 22 is mounted in one side of the turntable 21 that faces toward the front base panel 11, comprising a plurality of, for example, two transmission gears 221,222. The transmission gears 221,222 each comprise a center hole 2210,2220 disposed in axial alignment with the axle hole 210 of the turntable 21, and a series of gear teeth 2211,2221 equiangularly spaced around the periphery thereof. The clamping plates 23,24 each comprise an elongated extension wing plate portion 231,241 slidably inserted into one respective horizontal or vertical channels 13, a tooth rack 2311, 2411 extended along one long side of the elongated extension wing plate portion 231,241 and meshed with the gear teeth 2211,2221 of one respective transmission gear 221, 222, and a hooked clamping portion 232,242 located at one end of the elongated extension wing plate portion 231,241 and disposed outside the holder body 1. Thus, the hooked clamping portions 232,242 of the clamping plates 23,24 define with the front base panel 11 of the holder body 1 a clamping space 230 for securing a mobile tablet device 3.

In installation, mount the adjustment mechanism 2 in the accommodation chamber 10 of the holder body 1 between the front and back base panel 11,12 to couple the axle hole 210 of the turntable 21 and the axle holes 2210,2220 of the transmission gears 221,222 of the transmission gear set 22 to the stub axle 111 of the front base panel 11 and to let the position-limit rod 212 at the arm 211 of the turntable 21 be inserted through the arched sliding slot 14 and suspended above the locating plate 121, and respectively mount the clamping plates 23,24 in the horizontal and vertical channels 13 to keep the tooth racks 2311,2411 of the clamping plates 23,24 in engagement with the gear teeth 2211,2221 of the respective transmission gears 221,222 with the hooked clamping portions 232,242 of the clamping plates 23,24 respectively suspended outside the holder body 1. At this time, each two opposing clamping plates 23,24 can be moved horizontally or vertically to adjust the horizontal width or vertical height of the clamping space 230 according to the mobile tablet device 3 to be held.

Figure 6:
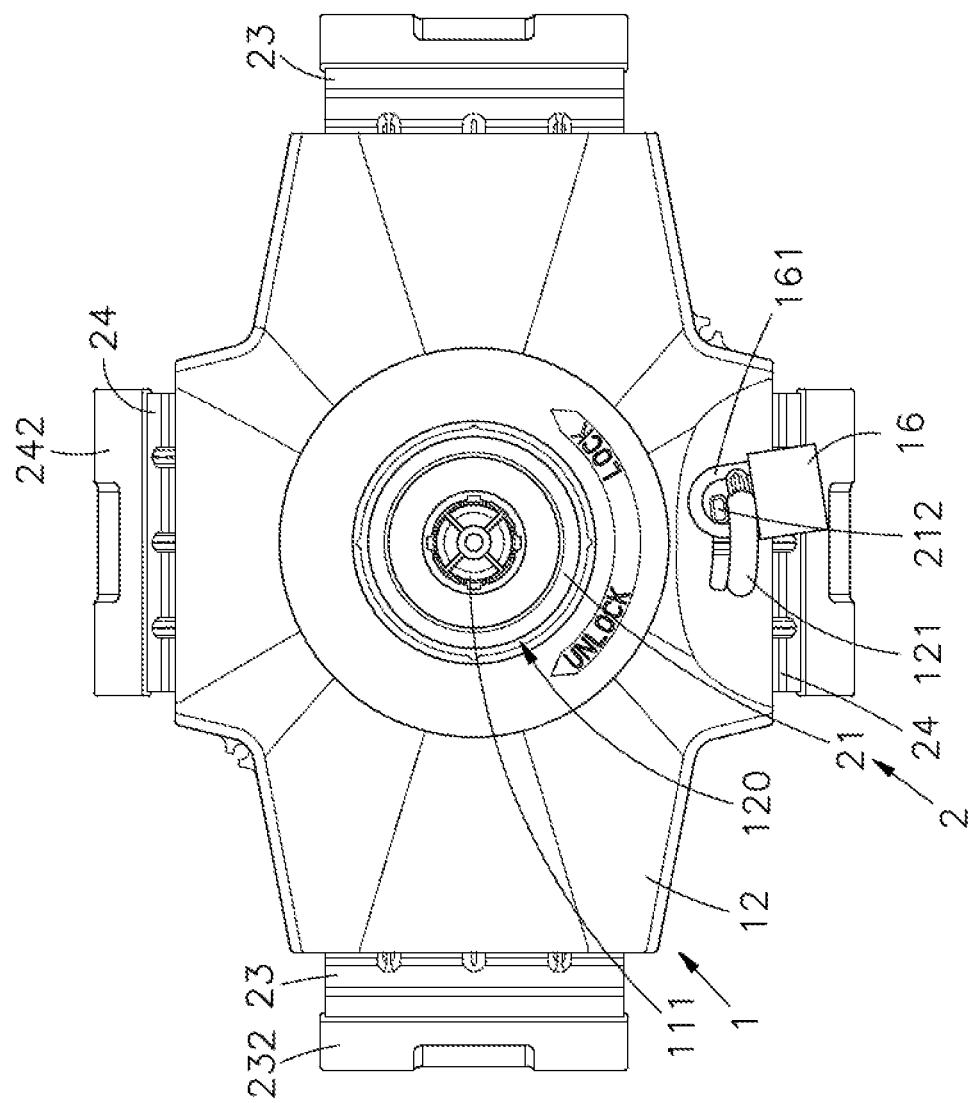
FIG. 6 is a rear view of the adjustable tablet device holder in accordance with the present invention.
Figure 7:
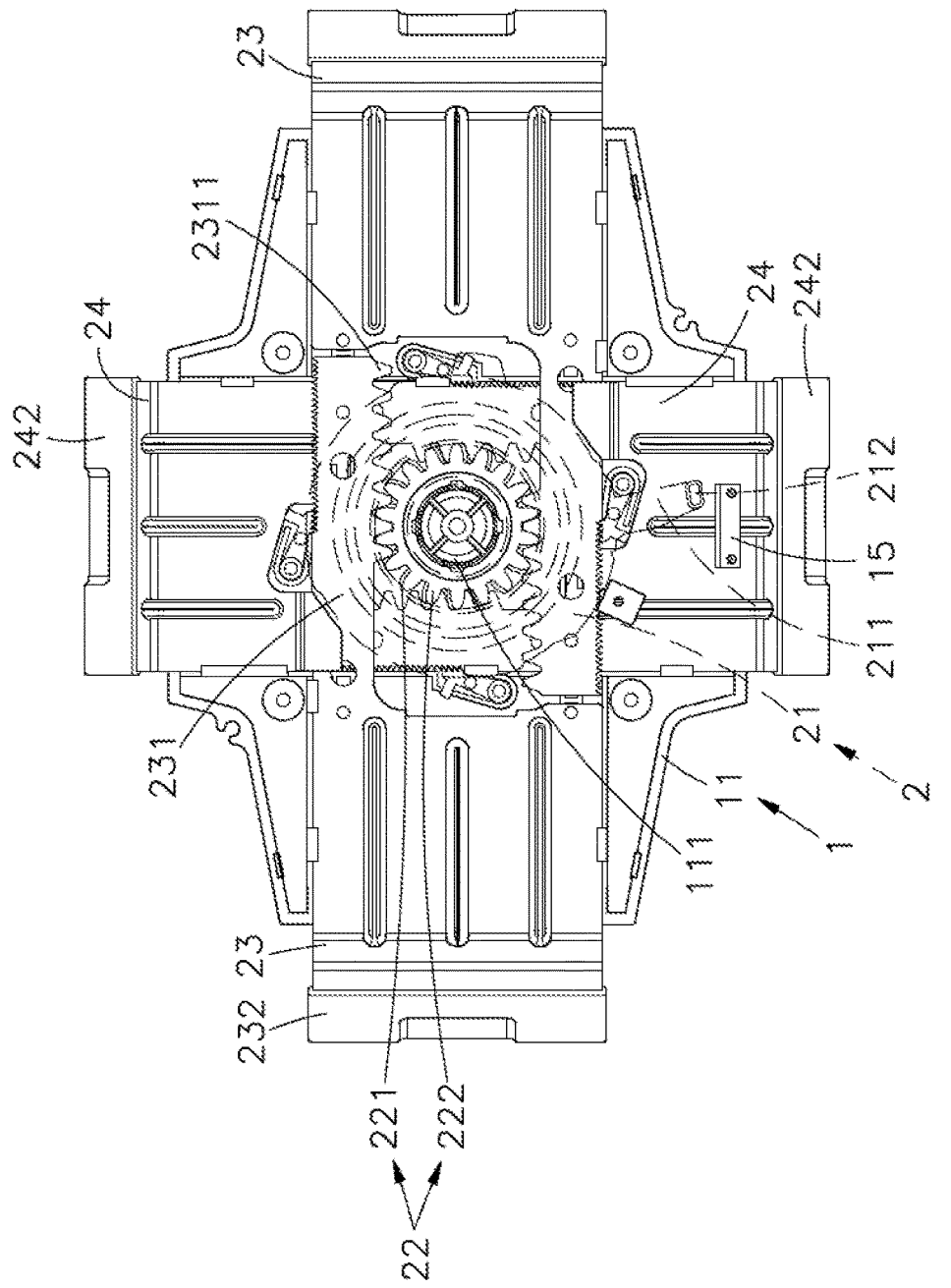
FIG. 7 is a front plain view of the adjustable tablet device holder in accordance with the present invention.
Figure 8:
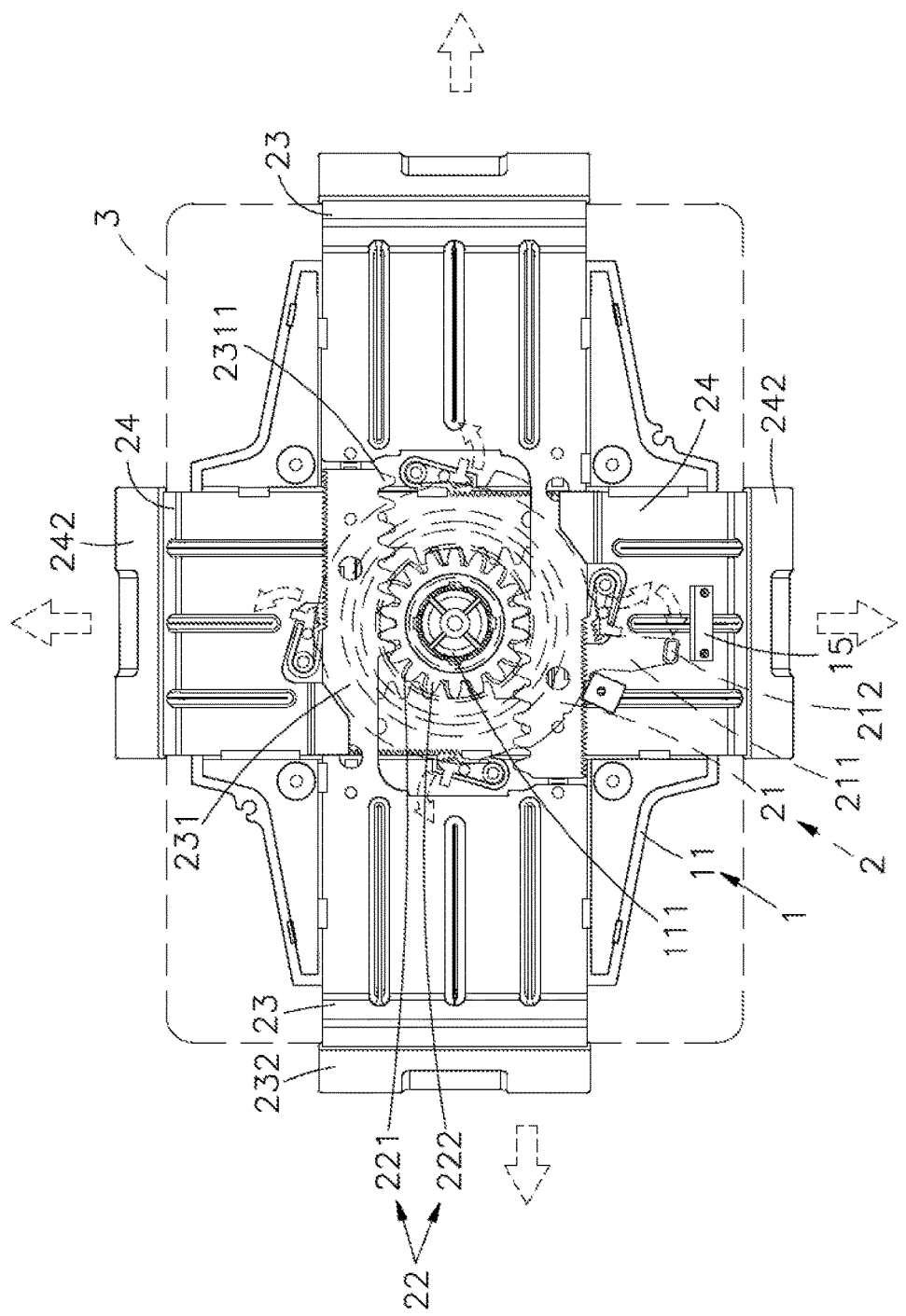
FIG. 8 corresponds to FIG. 7, illustrating the adjustment mechanism adjusted.

Referring to FIGS. 6-8 and FIGS. 4 and 5 again, as illustrated, the elongated extension wing plate portions 231,241 of the clamping plates 23,24 of the adjustment mechanism 2 are respectively slidably disposed in the crossed channels 13 in the accommodation chamber 10 inside the holder body 1 with the tooth racks 2311 at the elongated extension wing plate portions 231 of the two horizontally disposed clamping plates 23 respectively meshed with the gear teeth 2211 of the respective transmission gear 221 and the tooth racks 2411 at the elongated extension wing plate portions 241 of the two vertically disposed clamping plates 24 respectively meshed with the gear teeth 2221 of the respective transmission gear 222, thus, the two horizontally disposed clamping plates 23 and the two vertically disposed clamping plates 24 can be respectively moved relative to each other to adjust the horizontal width or vertical height of the clamping space 230 according to the mobile tablet device 3 to be held. The mobile tablet device can be a tablet computer, smart phone, or GPS.

Further, as stated above, the position-limit rod 212 of the turntable 21 of the adjustment mechanism 2 is extended through the arched sliding slot 14 of the holder body 1 and suspended above the locating plate 121. If the locating plate 121 of the holder body 1 is not locked, the user can move the position-limit rod 212 along the arched sliding slot 14 between the opposing left and right ends of the arched sliding slot 14 to rotate the turntable 21 of the transmission gears 221, 222 of the transmission gear set 22. Upon rotation of the transmission gears 221, 222, the meshed elongated extension wing plate portions 231, 241 of the clamping plates 23, 24 and respectively moved in or out of the respective channels 13 in the holder body 1. Further, the shackle 161 of the lock 16 can be inserted through the lock hole 1210 of the locating plate 121 and the locating hole 150 of the reinforcing plate 15 to lock the position-limit rod 212 to the locating plate 121 (see also FIGS. 2 and 3), prohibiting the position-limit rod 212 from movement relative to the holder body 1. At this time, the turntable 21 and the transmission gears 221, 222 of the transmission gear set 22 are prohibited from rotation, and, the tooth racks 2311, 2411 at the elongated extension wing plate portions 231, 241 of the clamping plates 23, 24 are prohibited from movement relative to the respective transmission gears 221, 222, and thus, the mobile tablet device 3 is firmly held in the clamping space 230 and locked to the hooked clamping portions 232, 242 of the clamping plates 23, 24 and well protected against theft, ensuring a high level of safety.

Further, the reinforcing plate 15 that is inserted into the locating plate 121 of the holder body 1 to reinforce the structural strength of the locating plate 121 can be a metal plate member. If the locating plate 121 is destructed by an external force, the reinforcing plate 15 can still effectively secure the shackle 161 of the lock 16 in the locked position, prohibiting the position-limit rod 212 from displacement relative to the holder body 1, achieving an effect of dual protection.

In conclusion, the invention provides an adjustable tablet device holder for holding a mobile tablet device 3. The adjustable tablet device holder comprises a holder body 1, which comprises an accommodation chamber 10, horizontal and vertical channels 13 defined in the accommodation chamber 10 in a crossed manner with the ends thereof disposed in communication with the space outside the holder body 1, an arched sliding slot 14 located in a back side thereof, and a locating plate 121 perpendicularly extended from the back side adjacent to a bottom side of the arched sliding slot 14, and an adjustment mechanism 2, which comprises a turntable 21 rotatably mounted in the accommodation chamber 10 of the holder body 1 and having an arm 211 extended from the periphery thereof and a position-limit rod 212 extended from the distal end of the arm 211 at right angles and inserted through the arched sliding slot 14 and slidable between two opposite ends of the arched sliding slot 14 above the locating plate 121, a reinforcing plate 15 inserted into the locating plate 121 to reinforce the structural strength of the locating plate 121, a transmission gear set 22 rotatable with the turntable 21 and two pairs of clamping plates 23,24 respectively slidably disposed at opposing left and right sides and opposing top and bottom sides and defining a clamping space 230 for securing the mobile tablet device 3 and movable to adjust the clamping space 230 upon rotation of the transmission gear set 22 and a lock 16 for fastening to the position-limit rod 212 to lock the position-limit rod 212 to the locating plate 121 and to stop the clamping plates 23,24 from displacement.

As stated above, the channels of the holder body of the adjustable tablet device holder are horizontally and vertically disposed in the accommodation chamber in a crossed manner; the arched sliding slot is located on the back base panel of the holder body; the locating plate is located at the back base panel on the outside of the holder body adjacent to the bottom side of the arched sliding slot; the turnable and transmission gear set are rotatably mounted in the accommodation chamber at the crossed point between the horizontally and vertically extended channels with the position-limit rod of the arm of the turntable inserted through the arched sliding slot and suspended above the locating plate so that the user can lock the lock the position-limit rod to the locating plate by a lock to stop the turntable and the transmission gear set from rotation, locking the clamping plates in position and protecting the loaded mobile tablet device against theft. Further, the reinforcing plate is inserted into the locating plate of the holder body to reinforce the structural strength of the locating plate against damage. Thus, the invention can lock the loaded mobile tablet device to the clamping space, ensuring a high level of safety.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable tablet device holder, comprising:
  a holder body comprising an accommodation chamber, a sliding slot located in a back side thereof, and a locating plate perpendicularly extended from the back side adjacent to a bottom side of said sliding slot;
  an adjustment mechanism mounted in said accommodation chamber of said holder body, said adjustment mechanism comprising a plurality of clamping plates arranged in two pairs and respectively mounted in opposing top and bottom sides and opposing left and right sides of said holder body and respectively movable in and out of said accommodation chamber of said holder body and adapted for holding a mobile tablet device, each said clamping plate comprising an elongated extension wing plate portion slidably inserted into said accommodation chamber of said holder body, a turntable mounted in said accommodation chamber and rotatable clockwise and counter-clockwise to move said elongated extension wing plate portions of each pair of said clamping plates inwardly or outwardly relative to each other, said turntable comprising an arm extended from a periphery thereof and a position-limit rod perpendicularly extended from a distal end of said arm and inserted through said sliding slot of said holder body and movable along said sliding slot to rotate said turntable and lockable to said locating plate of said holder body by a lock,
  wherein said holder body comprises a front base panel and a back base panel fastened together with said accommodation chamber defined therebetween; said sliding slot is located in said back base panel and disposed in communication with said accommodation chamber; said locating plate is perpendicularly extended from a back wall of said back base panel adjacent to the bottom side of said sliding slot, and comprises a lock hole for mounting of said lock, and
  wherein said holder body further comprises a reinforcing plate inserted into said locating plate to reinforce the structural strength of said locating plate, said reinforcing plate comprising a locating hole corresponding to said lock hole of said locating plate.

2. The adjustable tablet device holder as claimed in claim 1, wherein said holder body further comprises a horizontal channel and a vertical channel defined in said accommodation chamber in a crossed manner, and a stub axle suspended in said accommodation chamber at a crossed point between said horizontal channel and said vertical channel; said elongated extension wing plate portions of said clamping plates are respectively slidably mounted in two opposite ends of said horizontal channel and two opposite ends of said vertical channel; said turntable is rotatably mounted on said stub axle inside said accommodation chamber of said holder body.

3. The adjustable tablet device holder as claimed in claim 2, wherein said adjustment mechanism further comprises a transmission gear set mounted on said stub axle and rotatable with said turntable; each said clamping plate further comprises a tooth rack longitudinally located at one lateral side of the respective said elongated extension wing plate portion and meshed with said transmission gear set.

4. The adjustable tablet device holder as claimed in claim 2, wherein said holder body further comprises a through hole located in the back side in communication with said accommodation chamber for passing said stub axle to an outside of said holder body.

5. The adjustable tablet device holder as claimed in claim 1, wherein said sliding slot of said holder body is an arched slot located in the back side of said holder body in communication with said accommodation chamber; said locating plate exhibits an arched shape mating with the shape of said arched slot; said position-limit rod of said turntable of said adjustment mechanism is slidable between two opposite ends of said arched slot to rotate said turntable within a limited angle.

\* \* \* \* \*